(12) United States Patent
Sheng et al.

(10) Patent No.: US 10,771,134 B2
(45) Date of Patent: Sep. 8, 2020

(54) ELECTRONIC DEVICE AND WIRELESS COMMUNICATION METHOD

(71) Applicant: Sony Corporation, Tokyo (JP)

(72) Inventors: Bin Sheng, Nanjing (CN); Pingping Xu, Nanjing (CN); Wanlin Sun, Nanjing (CN); Meng Wang, Nanjing (CN); Penshun Lu, Beijing (CN)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/605,220

(22) PCT Filed: Apr. 18, 2018

(86) PCT No.: PCT/CN2018/083451
§ 371 (c)(1),
(2) Date: Oct. 15, 2019

(87) PCT Pub. No.: WO2018/228046
PCT Pub. Date: Dec. 20, 2018

(65) Prior Publication Data
US 2020/0127715 A1    Apr. 23, 2020

(30) Foreign Application Priority Data

Jun. 15, 2017 (CN) .......................... 2017 1 0451650

(51) Int. Cl.
*H04B 7/0456* (2017.01)
*H04B 7/0417* (2017.01)
(Continued)

(52) U.S. Cl.
CPC ......... *H04B 7/0486* (2013.01); *H04B 7/0417* (2013.01); *H04B 7/0426* (2013.01); *H04B 7/0639* (2013.01)

(58) Field of Classification Search
CPC .... H04B 17/24; H04B 7/0639; H04B 7/0486; H04B 7/0417; H04B 7/0426
See application file for complete search history.

(56) References Cited

U.S. PATENT DOCUMENTS

| 2013/0315162 | A1  | 11/2013 | Farkas et al. |
| 2018/0249452 | A1* | 8/2018  | Lee .......................... H04L 25/03 |
| 2019/0068256 | A1* | 2/2019  | Muruganathan ..... H04B 7/0478 |

FOREIGN PATENT DOCUMENTS

| CN | 104092516 A | 10/2014 |
| CN | 104735017 A | 6/2015 |
| CN | 106712892 A | 5/2017 |

OTHER PUBLICATIONS

International Search Report and Written Opinion dated Jun. 28, 2018 for PCT/CN2018/083451 filed on Apr. 18, 2018, 8 pages including English Translation of the International Search Report.

* cited by examiner

*Primary Examiner* — Sung S Ahn
(74) *Attorney, Agent, or Firm* — Xsensus LLP

(57) ABSTRACT

The present application relates to an electronic device and a wireless communication method. The electronic device comprises: a processing circuit, configured to select a modulation codebook from a modulation codebook cluster for use in a multiple-input multiple-output MIMO system on the basis of a channel matrix of the MIMO system, the modulation codebook cluster comprising a plurality of modulation codebooks used by a sending terminal device corresponding to the electronic device for generating modulation signals, wherein the number of data streams transmitted after modulation is greater than the number of orthogonal channels; and a transceiving circuit, configured to send feedback information to the sending terminal device, the feedback information comprising identification information of the selected (Continued)

modulation codebook. Using the electronic device and the wireless communication method of the present application can increase the number of data streams that can be transmitted independently in a MIMO system, thus improving transmission efficiency.

14 Claims, 9 Drawing Sheets

(51) Int. Cl.
*H04B 7/0426* (2017.01)
*H04B 7/06* (2006.01)

First layer $\begin{bmatrix} 0 & 0 & 0 & 0 \\ -0.1815-0.1318i & -0.6351-0.4615i & 0.6351+0.4615i & 0.1815+0.1318i \\ 0 & 0 & 0 & 0 \\ 0.7851 & -0.2243 & 0.2243 & -0.7851 \end{bmatrix}$ Second layer $\begin{bmatrix} 0.7851 & -0.2243 & 0.2243 & -0.7851 \\ 0 & 0 & 0 & 0 \\ -0.1815-0.1318i & -0.6351-0.4615i & 0.6351+0.4615i & 0.1815+0.1318i \\ 0 & 0 & 0 & 0 \end{bmatrix}$ Third layer $\begin{bmatrix} -0.6351+0.4615i & 0.1815-0.1318i & -0.1815+0.1318i & 0.6351-0.4615i \\ 0.1392-0.1759i & 0.4873-0.6156i & -0.4873+0.6156i & -0.1392+0.1759i \\ 0 & 0 & 0 & 0 \\ 0 & 0 & 0 & 0 \end{bmatrix}$ Fourth layer $\begin{bmatrix} 0 & 0 & 0 & 0 \\ 0 & 0 & 0 & 0 \\ 0.7851 & -0.2243 & 0.2243 & -0.7851 \\ -0.0055-0.2242i & -0.0193-0.7848i & 0.0193+0.7848i & 0.0055+0.2242i \end{bmatrix}$ Fifth layer $\begin{bmatrix} -0.0055-0.2242i & -0.0193-0.7848i & 0.0193+0.7848i & 0.0055+0.2242i \\ 0 & 0 & 0 & 0 \\ 0 & 0 & 0 & 0 \\ -0.6351+0.4615i & 0.1815-0.1318i & -0.1815+0.1318i & 0.6351-0.4615i \end{bmatrix}$ Sixth layer $\begin{bmatrix} 0 & 0 & 0 & 0 \\ 0.7851 & -0.2243 & 0.2243 & -0.7851 \\ 0.1392-0.1759i & 0.4873-0.6156i & -0.4873+0.6156i & -0.1392+0.1759i \\ 0 & 0 & 0 & 0 \end{bmatrix}$

Figure 2

ELECTRONIC DEVICE AND WIRELESS COMMUNICATION METHOD

CROSS-REFERENCE TO RELATED APPLICATIONS

This application is based on PCT filing PCT/CN2018/083451, filed Apr. 18, 2018, which claims the priority to Chinese Patent Application No. 201710451650.1 titled "ELECTRONIC DEVICE AND WIRELESS COMMUNICATION METHOD", filed with the Chinese Patent Office on Jun. 15, 2017, the entire contents of each are incorporated herein by reference.

FIELD

Embodiments of the present disclosure generally relate to the technical field of wireless communications, in particular to an electronic equipment and a wireless communication method, and more particularly to an electronic equipment as a receiving side equipment in an MIMO communication system, an electronic equipment as a transmitting side equipment in an MIMO communication system, a wireless communication method performed by a receiving side equipment in an MIMO communication system, and a wireless communication method performed by a transmitting side equipment in an MIMO communication system.

BACKGROUND

The Multiple-Input Multiple-Output (MIMO) technology is a technology in which multiple transmitting antennas and multiple receiving antennas are respectively used at the transmitting side and the receiving side. With this technology, a transmission signal can be transmitted through multiple antennas at the transmitting side and the receiving side, thereby improving communication quality. Further, space resources can be fully utilized, the Multiple-Input Multiple-Output can be achieved through multiple antennas, and system capacity can be effectively increased without increasing spectrum resources and antenna transmission power.

The non-orthogonal transmission technology is a technology in which a signal is transmitted in a non-orthogonal manner at the transmitting side. For example, each subchannel or subcarrier is no longer allocated to one user, but is shared by multiple users. Multiple users on the same subchannel or subcarrier transmit signals in a non-orthogonal manner. The receiving side demodulates data of the multiple users by an interference cancellation method. The Sparse Code Multiple Access (SCMA) technology is one of non-orthogonal transmission technologies. In the SCMA technology, user data is spread to limited subchannels or subcarriers by the sparse spread spectrum to reduce system complexity.

It is desired to provide a solution combining the MIMO technology with the non-orthogonal transmission technology, to increase the number of data flows that can be independently transmitted in an MIMO system, thereby improving transmission efficiency.

SUMMARY

This part provides an overview of the present disclosure, rather than a full scope or all features of the present disclosure.

An object of the present disclosure is to provide an electronic equipment and a wireless communication method combining the MIMO technology with the non-orthogonal transmission technology, to increase the number of data flows that can be independently transmitted in an MIMO system, thereby improving transmission efficiency.

According to an aspect of the present disclosure, an electronic equipment is provided. The electronic equipment includes a processing circuit and a transceiver circuit. The processing circuit is configured to select, in accordance with a channel matrix of a Multi-Input Multi-Output MIMO system, a modulation code book from a modulation code book cluster used for the MIMO system. The modulation code book cluster includes multiple modulation code books used for generating a modulated signal by a transmitting side equipment corresponding to the electronic equipment and whose number of data flows transmitted after modulation is bigger than the number of an orthogonal channel. The transceiver circuit is configured to transmit feedback information to the transmitting side equipment. The feedback information includes identification information of the selected modulation code book.

According to another aspect of the present disclosure, an electronic equipment is provided. The electronic equipment includes a transceiver circuit and a processing circuit. The transceiver circuit is configured to receive feedback information. The feedback information includes identification information of a modulation code book. The processing circuit is configured to select, from a modulation code book cluster used for a Multi-Input Multi-Output MIMO system, a modulation code book to be used according to the identification information of the modulation code book, and generate a modulated signal according to the modulation code book to be used and generate a transmission signal according to the modulated signal. The modulation code book cluster includes multiple modulation code books used for generating a modulated signal by the electronic equipment and whose number of data flows transmitted after modulation is bigger than the number of an orthogonal channel. The transceiver circuit is further configured to transmit the transmission signal.

According to another aspect of the present disclosure, a wireless communication method performed by an electronic equipment is provided. The wireless communication method includes:

selecting, in accordance with a channel matrix of a Multi-Input Multi-Output MIMO system, a modulation code book from a modulation code book cluster used for the MIMO system, where the modulation code book cluster includes multiple modulation code books used for generating a modulated signal by transmitting side equipment corresponding to the electronic equipment and whose number of data flows transmitted after modulation is bigger than the number of an orthogonal channel; and transmitting feedback information to the transmitting side equipment, where the feedback information includes identification information of the selected modulation code book.

According to another aspect of the present disclosure, a wireless communication method performed by an electronic equipment is provided. The wireless communication method includes:

receiving feedback information, the feedback information including identification information of a modulation code book;

selecting, from a modulation code book cluster used for a Multi-Input Multi-Output MIMO system, a modulation code book to be used according to the identification information of the modulation code book, where the modulation code book cluster includes multiple modulation code books used for generating a modulated signal by the electronic equipment and whose number of data flows transmitted after modulation is bigger than the number of an orthogonal channel;

generating a modulated signal according to the modulation code book to be used and generating a transmission signal according to the modulated signal; and transmitting the transmission signal.

With the electronic equipment and the wireless communication method provided in the present disclosure, a suitable modulation code book can be selected from a modulation code book cluster used for an MIMO system and whose number of data flows transmitted after modulation is bigger than the number of an orthogonal channel, and identification information of the selected modulation code book can be transmitted. In this way, the transmitting side equipment can modulate the data to be transmitted to multiple transmitting antennas using the modulation code book, thereby implementing non-orthogonal transmission of single user data on the multiple transmitting antennas, increasing the number of data flows independently transmitted between the transmitting side equipment and the receiving side equipment, and improving transmission efficiency.

Further applicability range is apparent from the description provided herein. The descriptions and specific examples in the overview are merely for the purpose of illustration and are not intended to limit the scope of the present disclosure.

BRIEF DESCRIPTION OF THE DRAWINGS

The drawings described herein are provided merely for the purpose of illustrating the selected embodiments rather than all possible embodiments, and are not intended to limit the scope of the present disclosure. In the drawings:

FIG. 2 is a schematic structural diagram showing a modulation code book based on SCMA according to an embodiment of the present disclosure;

Figure 1:
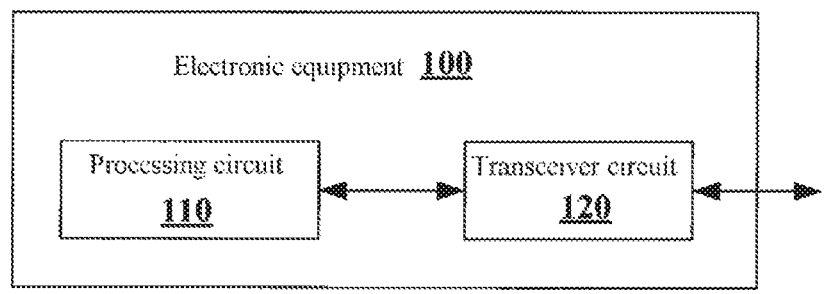
FIG. 1 is a block diagram showing a configuration example of an electronic equipment according to an embodiment of the present disclosure.

While specific embodiments of the present disclosure are shown as examples in the drawings and are described herein in detail, various modifications and variations may be made to the present disclosure. It should be understood that the description for the specific embodiments herein is not intended to limit the present disclosure to the disclosed specific forms, and the present disclosure is intended to encompass all modifications, equivalents and alternatives that fall within the spirit and scope of the present disclosure. It should be noted that reference numerals indicate parts corresponding to the reference numerals throughout the drawings.

DETAILED DESCRIPTION OF EMBODIMENTS

Examples of the present disclosure are described more fully with reference to the drawings. The following description is merely exemplary rather than being intended to limit the present disclosure and applications or purposes of the present disclosure.

Exemplary embodiments are provided to make the present disclosure be exhaustive and fully convey the scope of the present disclosure to those skilled in the art. Various specific details such as specific components, devices and methods are set forth to provide thorough understanding for the embodiments of the present disclosure. It is apparent to those skilled in the art that the exemplary embodiments may be embodied in many different forms without the specific details, and the specific details are not interpreted as a limit for the scope of the present disclosure. In some exemplary embodiments, well-known processes, well-known structures and well-known technology are not described in detail.

The present disclosure is described below in the following order:

1. Application Scenario;
2. First Embodiment;
3. Second Embodiment;
4. Third Embodiment;
5. Fourth Embodiment;
6. Application Example.

1. Application Scenario

The present disclosure is applicable to an MIMO communication system, that is, a communication system in which a transmitting side equipment uses multiple transmitting antennas and a receiving side equipment uses multiple receiving antennas. The communication system herein includes a cellular communication system, a Device to Device (D2D) communication system, a Machine to Machine (M2M) communication system, a Vehicle to Vehicle (V2V) communication system, a communication system including a relay, and the like. That is, the present disclosure is applicable to any MIMO communication system including a transmitting side equipment and a receiving side equipment.

According to an embodiment of the present disclosure, the transmitting side equipment and the receiving side equipment may be implemented as a network side device and a terminal device. For example, in uplink transmission of cellular communication, the receiving side equipment may be implemented as a network side device, and the transmitting side equipment may be implemented as a terminal device; in downlink transmission of cellular communication, the receiving side equipment may be implemented as a terminal device, and the transmitting side equipment may be implemented as a network side device; and in a communication mode such as D2D communication, M2M communication and V2V communication, the transmitting side equipment and the receiving side equipment each may be implemented as a terminal device.

2. First Embodiment

In this embodiment, a receiving side equipment according to an embodiment of the present disclosure is described in detail. FIG. 1 is a block diagram showing a configuration example of an electronic equipment 100 according to an embodiment of the present disclosure. The electronic equipment 100 herein may function as a receiving side equipment in an MIMO system. That is, the electronic equipment 100 has multiple receiving antennas to receive data from a transmitting side equipment. The transmitting side equipment corresponding to the electronic equipment 100 may function as a transmitting side equipment in the MIMO system, that is, the transmitting side equipment has multiple transmitting antennas. According to an embodiment of the present disclosure, the electronic equipment 100 may have the same number of antennas as the transmitting side equipment.

As shown in FIG. 1, the electronic equipment 100 may include a processing circuit 110 and a transceiver circuit 120. It should be noted that the electronic equipment 100 may include one processing circuit 110 or multiple processing circuits 110.

Further, the processing circuit 110 may include various discrete functional units to perform various different functions and/or operations. It should be noted that the functional units may be physical entities or logical entities, and units referred to as different names may be implemented by a same physical entity.

The transceiver circuit 120 is used for transmission and reception of data. For example, the transceiver circuit 120 may be implemented as a transceiver.

According to an embodiment of the present disclosure, the processing circuit 110 may select, in accordance with a channel matrix of the MIMO system, a modulation code book from a modulation code book cluster for the MIMO system. The modulation code book cluster includes multiple modulation code books used for generating a modulated signal by the transmitting side equipment corresponding to the electronic equipment 100 and whose number of data flows transmitted after modulation is bigger than the number of an orthogonal channel. Further, the processing circuit 110 may determine identification information of the selected modulation code book, such as numbering of the selected modulation code book, and the processing circuit 110 may transmit the identification information of the modulation code book to the transceiver circuit 120.

According to an embodiment of the present disclosure, the transceiver circuit 120 may transmit feedback information including the identification information of the selected modulation code book. The transceiver circuit 120 may receive the identification information of the selected modulation code book from the processing circuit 110 and transmit the identification information of the selected modulation code book to the transmitting side equipment corresponding to the electronic equipment 100.

It can be seen that, with the electronic equipment provided in the present disclosure, a suitable modulation code book can be selected from a modulation code book cluster used for an MIMO system and whose number of data flows transmitted after modulation is bigger than the number of an orthogonal channel, and identification information of the selected modulation code book can be transmitted. In this way, the transmitting side equipment can modulate the data to be transmitted to multiple transmitting antennas using the modulation code book, thereby implementing non-orthogonal transmission of single user data on the multiple transmitting antennas, increasing the number of data flows independently transmitted between the transmitting side equipment and the receiving side equipment, and improving transmission efficiency.

According to an embodiment of the present disclosure, the modulation code book cluster may be stored in advance at the electronic equipment 100, and the transmitting side equipment corresponding to the electronic equipment 100 stores the same modulation code book cluster. Further, the modulation code book cluster includes multiple modulation code books. The modulation code books may be used to determine a modulation mode for data in the MIMO system, that is, to generate a modulated signal by the transmitting side equipment. Further, the number of data flows transmitted after modulation using the modulation codes is bigger than the number of the orthogonal channel.

According to an embodiment of the present disclosure, each modulation code book includes at least the following parameters: the dimension number of the modulation code book; and the number of layers of the modulation code book. According to an embodiment of the present disclosure, the dimension number of the modulation code book represents the number of the orthogonal channel after modulation, and the orthogonal channel is used to carry the transmitted data flows. The number of layers of the modulation code book represents the number of data flows transmitted after modulation. In the present disclosure, the number of data flows transmitted after modulation using a modulation code book refers to the number of data flows independently transmitted after modulation. There is no interference between the independently transmitted data flows. The number of layers of each modulation code book is bigger than the dimension number of the modulation code book such that the number of data flows independently transmitted after modulation is bigger than the number of the orthogonal channel. That is, less orthogonal channels carry more transmitted data flows.

Each modulation code book may include multiple code words having the same dimension number. Therefore, the dimension number of the modulation code book indicates the dimension number of the code word in the modulation code book. The dimension number of the modulation code book indicates the number of orthogonal channels required after modulation using the modulation code book. That is, if the dimension number of the modulation code book is equal to four, it is indicated that four mutually orthogonal channels are required to transmit the data modulated by using the modulation code book.

Further, the number of layers of the modulation code book indicates the number of independent data flows that may be transmitted after modulation using the modulation code book. For example, if the number of layers of the modulation code book is equal to six, it is indicated that six independent data flows may be transmitted after modulation using the modulation code book.

According to an embodiment of the present disclosure, the dimension number of the modulation code book is smaller than the number of layers. In this case, after the data is modulated by using the modulation code book, less orthogonal channels can be used to transmit more independent data flows, thereby increasing the number of data flows that can be independently transmitted, and improving transmission efficiency.

According to an embodiment of the present disclosure, the modulation code book included in the modulation code book cluster includes, but is not limited to, a modulation code book based on SCMA. The modulation code book in the modulation code book cluster is described below by taking the modulation code book based on SCMA as an example, but those skilled in the art should understand that other types of code books whose number of layers is bigger than the dimension number are also applicable to the present disclosure.

According to an embodiment of the present disclosure, one constellation map is present on each layer of the modulation code book based on SCMA, and the dimension number of the constellation map is the dimension number of the modulation code book. In addition, each constellation map includes multiple constellation points, each of which is a sparse vector, that is, one or more zero elements exist.

FIG. 2 is a schematic structural diagram showing a modulation code book based on SCMA according to an embodiment of the present disclosure. As shown in FIG. 2, the dimension number of the modulation code book based on SCMA is equal to fourth, and the number of layers thereof is equal to six. On each layer of the modulation code book, there is one constellation map. The modulation code book includes six constellation maps, each having the dimension number of four.

Figure 3:
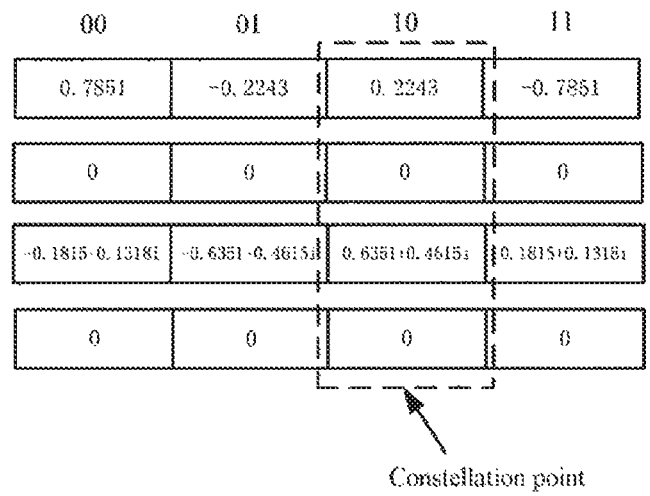
FIG. 3 is a schematic diagram showing a constellation map of a second layer in the modulation code book based on SCMA shown in FIG. 2.

A structure of each constellation map is described below with reference to FIG. 3, which is a schematic diagram showing a constellation map of a second layer in the modulation code book based on SCMA shown in FIG. 2. As shown in FIG. 3, the constellation map of the second layer includes four constellation points, each of which is a sparse vector. For example, among constellation points shown in the box of FIG. 3, there are two zero elements and two non-zero elements.

According to an embodiment of the present disclosure, the modulation code books included in the modulation code book cluster may have different dimension numbers, and the dimension numbers of all the modulation code books are no bigger than the number of receiving antennas of the electronic equipment 100. Further, the minimum dimension number of the modulation code book in the modulation code book cluster is not less than two. That is, it is assumed that the number of receiving antennas of the electronic equipment 100 is S (S is an integer bigger than or equal to two), there may be at most (S−1) modulation code books in the modulation code book cluster stored at the electronic equipment 100. It is assumed that the number of receiving antennas of the electronic equipment 100 is eight. In an exemplary embodiment, the modulation code book cluster may include seven modulation code books respectively having dimension numbers of two, three, four, five, six, seven and eight. In another exemplary embodiment, the modulation code book cluster may include four modulation code books respectively having dimension numbers of two, four, six and eight. The above two embodiments are merely exemplary, and the modulation code book cluster may also include other numbers of modulation code books.

According to an embodiment of the present disclosure, the processing circuit 110 may select a suitable modulation code book from the modulation code book cluster used for the MIMO system according to certain criteria.

According to an embodiment of the present disclosure, the processing circuit 110 may select the modulation code book according to the rank of the channel matrix of the MIMO system. The processing circuit 110 may estimate the channel between the electronic equipment 100 and the transmitting side equipment according to any method known in the art and calculate the rank of the channel matrix, which is not limited in the present disclosure. For example, the electronic equipment 100 may receive a reference signal from the transmitting side equipment to estimate the channel between the electronic equipment 100 and the transmitting side equipment.

According to an embodiment of the present disclosure, the processing circuit 110 may cause the dimension number of the selected modulation code book to be no bigger than the rank of the channel matrix of the MIMO system. For example, in the example in which the modulation code book cluster includes seven modulation code books respectively having dimension numbers of two, three, four, five, six, seven and eight, if it is assumed that the rank of the MIMO channel matrix between the electronic equipment 100 and the transmitting side equipment is equal to four, the processing circuit 110 may select a modulation code book having the dimension number of two, three or four.

According to an embodiment of the present disclosure, the processing circuit 110 may also cause the dimension number of the selected modulation code book to be equal to the dimension number of a modulation code book having the largest dimension number among modulation code books in the modulation code book cluster whose dimension numbers are no bigger than the rank of the channel matrix of the MIMO system. That is, the processing circuit 110 selects a modulation code book whose dimension number is as close as possible to the rank of the channel matrix. For example, in the example in which the modulation code book cluster includes seven modulation code books respectively having dimension numbers of two, three, four, five, six, seven and eight, if it is assumed that the rank of the MIMO channel matrix between the electronic equipment 100 and the transmitting side equipment is equal to four, the processing circuit 110 may select a modulation code book having the largest dimension number, i.e., a modulation code book having the dimension number of four, from modulation code books respectively having the dimension numbers of two, three and four.

The rank of the channel matrix represents a correlation between multiple transmission channels between the transmitting side equipment and the receiving side equipment in the MIMO system, and the dimension number represents the number of orthogonal channels required after modulation using the modulation code book. Thus, an embodiment of the present disclosure, the modulation code book is selected such that the dimension number of the modulation code book is no bigger than the rank of the channel matrix, thereby ensuring that the MIMO system can provide sufficient orthogonal channels for the selected modulation code book.

As described above, after the processing circuit 110 selects a suitable modulation code book according to certain criteria, the transceiver circuit 120 may transmit feedback information to the transmitting side equipment, where the feedback information includes identification information of the selected modulation code book. The identification information herein may include numbering of the modulation code book. According to an embodiment of the present disclosure, the number of required bits may be determined based on the number of modulation code books included in the modulation code book cluster, to map the numbering of the modulation code book to a binary identification. For example, if the modulation code book cluster includes seven modulation code books, the numbering may be 1, 2, 3, 4, 5, 6 and 7, and three bits are required to represent the numbering of each modulation code book.

According to an embodiment of the present disclosure, all layers of the selected modulation code book may be used by default. That is, after the electronic equipment 100 transmits the identification information of the selected modulation code book, the transmitting side equipment may modulate to-be-transmitted data to all layers of the selected modulation code book. In this way, the number of independently transmitted data flows can be maximized.

According to an embodiment of the present disclosure, the electronic equipment 100 may also select multiple layers from the selected modulation code book such that the transmitting side equipment modulates to-be-transmitted data to the multiple layers of the selected modulation code book. That is, the processing circuit 110 may select multiple layers from the selected modulation code book, and the transceiver circuit 120 may transmit identification information of the multiple layers.

According to an embodiment of the present disclosure, the processing circuit 110 may select multiple layers from all layers of the selected modulation code book according to certain criteria. For example, the processing circuit 110 may select the multiple layers according to at least one of: channel state of the MIMO system, rate requirement of the electronic equipment 100, and demodulation ability of the electronic equipment 100.

The large number of selected layers indicates the large number of data flows independently transmitted by using the modulation code book. Accordingly, the processing circuit 110 may select the number of the multiple layers according to at least one of the following parameters: channel state of the MIMO system, rate requirement of the electronic equipment 100, and demodulation ability of the electronic equipment 100. For example, in a case that the channel state of the MIMO system is relatively good, more layers are selected. In a case that the rate requirement of the electronic equipment 100 is relatively high, more layers are selected. In a case that the demodulation ability of the electronic equipment 100 is relatively high, more layers are selected. That is, the number of layers selected from the selected modulation code book is proportional to at least one of the above parameters. According to an embodiment of the present disclosure, how many layers and which layers in the modulation code book are selected may be determined by the processing circuit 110 according to a certain optimization algorithm, which is not limited in the present disclosure.

According to an embodiment of the present disclosure, the processing circuit 110 may select multiple layers of the modulation code book such that the number of selected multiple layers is bigger than the dimension number of the modulation code book. For example, if the dimension number of the modulation code book is equal to four and the number of layers thereof is equal to six, the processing circuit 110 may select five layers in the modulation code book, or may select six layers in the modulation code book.

According to an embodiment of the present disclosure, after the processing circuit 110 selects multiple layers of the modulation code book, the processing circuit may transmit identification information of the selected multiple layers to the transmitting side equipment. The identification information of the multiple layers may be represented in a form of a mapping table. For example, the mapping table includes multiple bits, where the number of the multiple bits is equal to the total number of layers of the selected modulation code book, and each bit corresponds to one of all layers of the selected modulation code book. In a case that a value of the bit is "1", it is indicated that the processing circuit 110 selects the layer corresponding to the bit. In a case that the value of the bit is "0", it is indicated that the processing circuit 110 does not select the layer corresponding to the bit. Taking the modulation code book having six layers shown in FIG. 2 as an example, the mapping table indicating the identification information of the multiple layers may be, for example, "1, 1, 0, 1, 1, 1". That is, the processing circuit 110 selects a first, second, fourth, fifth and sixth layers of the modulation code book shown in FIG. 2.

According to an embodiment of the present disclosure, the transceiver circuit 120 may combine the identification information of the selected modulation code book and the identification information of the multiple layers selected from the selected modulation code book in the feedback information to transmit those together, or may separately transmit these two types of information.

According to an embodiment of the present disclosure, the processing circuit 110 may further determine the power of the selected multiple layers, and the transceiver circuit 120 may further transmit power information of the multiple layers to the transmitting side equipment.

According to an embodiment of the present disclosure, the processing circuit 110 may determine the power of multiple layers according to certain criteria. For example, the processing circuit 110 may determine the power of the multiple layers according to at least one of: channel state of the MIMO system, rate requirement of the electronic equipment 100, and demodulation ability of the electronic equipment 100. According to an embodiment of the present disclosure, the power of each layer may be determined by the processing circuit 110 according to a certain optimization algorithm, which is not limited in the present disclosure.

According to an embodiment of the present disclosure, the transceiver circuit 120 may combine at least two of the identification information of the selected modulation code book, the identification information of the multiple layers selected from the selected modulation code book, and the power information of the selected multiple layers in the feedback information to transmit those together, or may separately transmit these three types of information.

According to an embodiment of the present disclosure, the processing circuit 110 may further generate information representing start or close of transmission based on the selected modulation code book, and the transceiver circuit 120 may transmit the information representing start or close of transmission based on the selected modulation code book.

According to an embodiment of the present disclosure, the processing circuit 110 may determine whether to start non-orthogonal transmission according to parameters such as channel state of the MIMO system, rate requirement of the electronic equipment 100, and configuration of the system. If the processing circuit 110 determines to start the non-orthogonal transmission, the processing circuit 110 may generate information representing the start of the transmission, and the transceiver circuit 120 may transmit such information to the transmitting side equipment.

Similarly, the transceiver circuit 120 may combine at least two of the identification information of the selected modulation code book, the identification information of the multiple layers selected from the selected modulation code book, the power information of the selected multiple layers, and the information representing start of transmission based on the selected modulation code book in the feedback information to transmit those together, or may separately transmit these four types of information.

According to an embodiment of the present disclosure, if the processing circuit 110 determines to close the transmission based on the selected modulation code book, the processing circuit 110 may generate information representing the close of the transmission, and the transceiver circuit 120 may transmit such information to the transmitting side equipment.

According to an embodiment of the present disclosure, one bit of information may be used to represent the start or close of transmission based on the selected modulation code book. For example, in a case that a value of the corresponding bit is "1", it is indicated that the transmission based on the selected modulation code book is started. In a case that the value of the corresponding bit is "0", it is indicated that the transmission based on the selected modulation code book is closed.

According to an embodiment of the present disclosure, the processing circuit 110 may combine the identification information of the selected modulation code book, the identification information of the multiple layers selected from the selected modulation code book, the power information of the selected multiple layers, and the information representing start of transmission based on the selected modulation code book into one message to be transmitted. For example, after the processing circuit 110 determines to start the transmission based on the selected modulation code book, the processing circuit 110 may select a suitable modulation code book, select multiple layers from the modulation code book and determine the power of each layer to generate signaling for carrying the feedback information including the above information.

Figure 4:
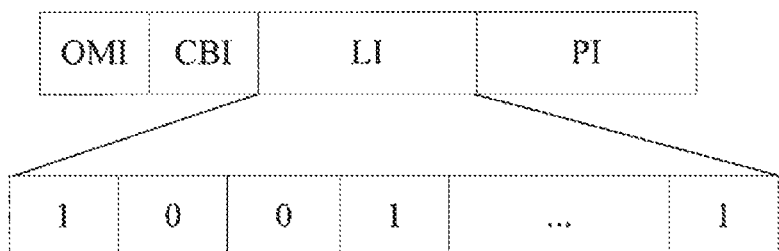
FIG. 4 is a schematic diagram showing signaling for carrying feedback information an embodiment of the present disclosure.

FIG. 4 is a schematic diagram showing signaling for carrying feedback information according to an embodiment of the present disclosure. As shown in FIG. 4, an OMI field indicates the start or close of the transmission based on the selected modulation code book. The OMI field may include one bit. In a case that a value of the bit is "1", it is indicated that the transmission based on the modulation code book represented by a CBI field is started. In a case that the value of the bit is "0", it is indicated that the transmission based on the modulation code book represented by the CBI field is closed. The CBI field indicates identification information of the selected modulation code book, and the number of bits included in the CBI field may be determined based on the number of modulation code books included in the modulation code book cluster. An LI field indicates identification information of the selected multiple layers, and may include multiple bits, where the number of the multiple bits is equal to the total number of layers of the modulation code book represented by the CBI field, and each bit corresponds to one layer of the selected modulation code book. In a case that a value of the bit is "1", it is indicated that the layer corresponding to the bit is selected. In a case that the value of the bit is "0", it is indicated that the layer corresponding to the bit is not selected. A PI field represents power information of multiple layers indicated by the LI field.

It should be understood that FIG. 4 only shows an example of the present disclosure. In a case that the electronic equipment 100 uses all layers of the selected modulation code book by default and does not need to transmit the power information of each layer, the signaling carrying the feedback information may include only the OMI field and the CBI field. In a case that the electronic equipment 100 uses all layers of the selected modulation code book by default and needs to transmit the power information of each of all layers, the signaling carrying the feedback information may include only the OMI field, the CBI field, and the PI field. In a case that the electronic equipment 100 needs to select multiple layers from the selected modulation code book and does not need to transmit the power information of each layer, the signaling carrying the feedback information may include only the OMI field, the CBI field, and the LI field.

According to an embodiment of the present disclosure, the transceiver circuit 120 may further receive a transmission signal from the transmitting side equipment. After the transmitting side equipment receives the feedback information transmitted by the electronic equipment 100, the transmitting side equipment may generate a modulated signal based on the modulation code book selected by the electronic equipment 100, and generate the transmission signal according to the generated modulated signal. The transmitting side equipment may transmit the transmission signal at an agreed time, so that the transceiver circuit 120 of the electronic equipment 100 can receive the transmission signal at the agreed time.

As described above, with the electronic equipment 100 according to the embodiment of the present disclosure, a suitable modulation code book can be selected from a modulation code book cluster used for an MIMO system, and identification information of the selected modulation code book can be transmitted. Further, with the electronic equipment 100, multiple layers can also be selected from the selected modulation code book. In this way, the transmitting side equipment can modulate the data to be transmitted to multiple transmitting antennas using the modulation code book, thereby implementing non-orthogonal transmission of single user data on the multiple transmitting antennas. This solution can be applied in any MIMO system, including uplink transmission and downlink transmission. In addition, since the number of layers of the modulation code book is bigger than the dimension number thereof, the transmitting side equipment can transmit more independent data flows by using less orthogonal channels, thereby increasing the numbers of data flows independently transmitted between the transmitting side equipment and the receiving side equipment, and improving transmission efficiency.

3. Second Embodiment

Figure 5:
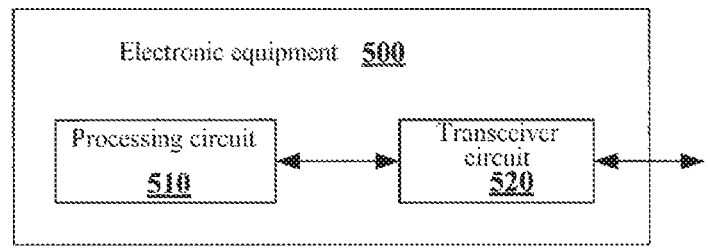
FIG. 5 is a block diagram showing a configuration example of an electronic equipment according to another embodiment of the present disclosure.

In this embodiment, a transmitting side equipment according to an embodiment of the present disclosure is described in detail. FIG. 5 is a block diagram showing a configuration example of an electronic equipment 500 according to an embodiment of the present disclosure. The electronic equipment 500 herein may function as a transmitting side equipment in an MIMO system. That is, the electronic equipment 500 has multiple transmitting antennas to transmit data to a receiving side equipment.

As shown in FIG. 5, the electronic equipment 500 may include a processing circuit 510 and a transceiver circuit 520. It should be noted that the electronic equipment 500 may include one processing circuit 510 or multiple processing circuits 510.

Further, the processing circuit 510 may include various discrete functional units to perform various different functions and/or operations. It should be noted that the functional units may be physical entities or logical entities, and units referred to as different names may be implemented by a same physical entity.

The transceiver circuit 520 is used for transmission and reception of data. For example, the transceiver circuit 520 may be implemented as a transceiver.

According to an embodiment of the present disclosure, the transceiver circuit 520 may receive feedback information including identification information of a modulation code book. Further, the transceiver circuit 520 may transmit the received identification information of the modulation code book to the processing circuit 510.

According to an embodiment of the present disclosure, the processing circuit 510 may select, from a modulation code book cluster used for an MIMO system, a modulation code book to be used according to the identification information of the modulation code book. The modulation code book cluster includes multiple modulation code books used for generating a modulated signal by the electronic equipment 500 and whose number of data flows transmitted after modulation is bigger than the number of an orthogonal channel.

The modulation code book cluster may be stored in advance at the electronic equipment 500, and the modulation code book cluster is the same as that at the receiving side equipment. The arrangement and structure of the modulation code book included in the modulation code book cluster have been described in detail in the first embodiment, which is not repeated herein. In this way, the processing circuit 510 can select the modulation code book to be used from the pre-stored modulation code book cluster according to the identification information of the modulation code book selected by the receiving side. For example, when the electronic equipment 500 receives the signaling shown in FIG. 4, the electronic equipment 500 may read the CBI field to determine the identification information of the modulation code book selected by the receiving side, thereby finding the modulation code book selected by the receiving side from the modulation code book cluster.

Further, the processing circuit 510 may further generate a modulated signal according to the modulation code book to be used, and generate a transmission signal according to the modulated signal, so that the transceiver circuit 520 can transmit the transmission signal.

According to an embodiment of the present disclosure, if the electronic equipment 500 does not receive identification information on multiple layers of the selected modulation code book from the receiving side equipment, the electronic equipment 500 may determine to use all layers of the selected modulation code book.

According to an embodiment of the present disclosure, the feedback information may further include identification information of multiple layers, and the processing circuit 510 may further select multiple layers to be used from the modulation code book to be used according to the identification information of the multiple layers.

As described above, the identification information of the multiple layers may be represented in the form of a mapping table. For example, when the electronic equipment 500 receives the signaling shown in FIG. 4, the electronic equipment 500 may read the LI field to acquire multiple bits, and determine, according to a bit value of each bit, whether the receiving side selects the layer corresponding to the bit.

According to an embodiment of the present disclosure, the feedback information may further include power information of the multiple layers. For example, when the electronic equipment 500 receives the signaling shown in FIG. 4, the electronic equipment 500 may read the PI field to acquire power information of each of the multiple layers.

According to an embodiment of the present disclosure, the feedback information may further include information representing start or close of transmission based on the modulation code book included in the feedback information. For example, when the electronic equipment 500 receives the signaling shown in FIG. 4, the electronic equipment 500 may read the OMI field. In a case that a value of the OMI field is "1", it is indicated that the transmission based on the modulation code book represented by the CBI field is started. In a case that the value of the OMI field is "0", it is indicated that the transmission based on the modulation code book represented by the CBI field is closed. In this case, the electronic equipment 500 may terminate the transmission based on the modulation code book represented by the CBI field. It should be understood that the transceiver circuit 520 of the electronic equipment 500 may also receive separate signaling representing close of the non-orthogonal transmission.

According to an embodiment of the present disclosure, after the electronic equipment 500 receives the information representing the start of transmission based on the modulation code book based on SCMA, the electronic equipment 500 determines the modulation code book to be used, and optionally, may further determine power information of a layer to be used or each layer of the modulation code book. The electronic equipment 500 may perform transmission based on the modulation code book according to the modulation code book to be used, and optionally further according to the power information of the layer to be used or each layer in the modulation code book.

According to an embodiment of the present disclosure, the processing circuit 510 may generate a modulated signal according to the modulation code book to be used.

According to an embodiment of the present disclosure, after the electronic equipment 500 determines the modulation code book, the electronic equipment 500 may determine a modulated signal on each of the multiple layers using the modulation code book. If the electronic equipment 500 does not receive information on multiple layers of the selected modulation code book, the multiple layers represent all layers of the selected modulation code book. If the electronic equipment 500 receives information on multiple layers of the selected modulation code book, the multiple layers represent selected multiple layers.

According to an embodiment of the present disclosure, the modulated signal generated by the processing circuit 510 is the sum of modulated signals on layers of the selected modulation code book. That is, a modulated signal X generated by the processing circuit 510 may be expressed as:

$$X = \sum_{j \in \phi} \sqrt{E_j}\, x_j$$

where X represents a modulated signal generated by the processing circuit 510, $\Phi$ represents a set including the sequence number of each of the multiple layers selected from the selected modulation code book. If the electronic equipment 500 does not receive information on the selected layer, $\Phi$ includes the sequence number of each of all layers of the selected modulation code book, $\sqrt{E_j}\, x_j$ represents a modulated signal of a j-th layer, $E_j$ represents the power of the j-th layer, and $x_j$ represents output data of the j-th layer.

For example, in a case that the CBI field in the signaling received by the electronic equipment 500 indicates that the receiving side equipment selects the modulation code book as shown in FIG. 2 and information indicated by the LI field is "1, 1, 0, 1, 1, 1", it is indicated that the receiving side equipment selects the first, second, fourth, fifth and sixth layers of the modulation code book shown in FIG. 2. Then, as described above, the modulated signal generated by the electronic equipment 500 may be expressed as $$X=\sqrt{E_1}x_1+\sqrt{E_2}x_2+\sqrt{E_4}x_4+\sqrt{E_5}x_5+\sqrt{E_6}x_6$$

where $\sqrt{E_1}$, $\sqrt{E_2}$, $\sqrt{E_4}$, $\sqrt{E_5}$ and $\sqrt{E_1}$ may be obtained from the PI field in the signaling.

According to an embodiment of the present disclosure, the electronic equipment 500 may split a bit stream that needs to be transmitted into multiple input data and input the multiple input data respectively to the selected multiple layers, and determine output data on each layer according to a constellation map of the layer.

According to an embodiment of the present disclosure, a bit stream to be transmitted is split according to the dimension number of a modulation code book to be used to determine input data of each layer. Specifically, the bit stream to be transmitted is split in units of log 2Q, where Q is the dimension number of the modulation code book to be used.

For example, in a case that the electronic equipment 500 is to use the modulation code book shown in FIG. 2, it is assumed that the bit stream to be transmitted is "0100101110", the processing circuit 510 may split the bit stream to be transmitted in units of two bits, that is, split the bit stream into multiple input data "01", "00", "10", "11" and "10" respectively as input data of the first, second, fourth, and fifth and sixth layers of the modulation code book shown in FIG. 2.

According to an embodiment of the present disclosure, the processing circuit 510 may determine output data of each layer according to the input data of the layer and the constellation map of the layer. Taking the constellation map shown in FIG. 3 as an example, in a case that the input data is "00", the output data is $[0.7851, 0, -0.1815-0.1318i, 0]^T$. In a case that the input data is "01", the output data is $[-0.2243, 0, -0.6351-0.4615i, 0]^T$. In a case that the input data is "10", the output data is $[0.2243, 0, 0.6351+0.4615i, 0]^T$. In a case that the input data is "11", the output data is $[-0.7851, 0, 0.1815+0.1318i, 0]^T$. The output data of each layer is a sparse vector.

In this way, the output data of each of the selected multiple layers can be determined, that is, $x_1=[0,-0.6351-0.4615i,0,-0.2243]^T$, $x_2=[0.7851,0,-0.1815-0.1318i,0]^T$, $x_4=[0,0,0.2243,0.0193+0.7848i]^T$, $x_5=[0.055+0.2242i,0,0,0.6351-0.4615i]^T$, $x_6=[0,0.2243,-0.4873+0.6156i,0]^T$.

As described above, the processing circuit 510 may generate a modulated signal using a modulation code book selected by the receiving side equipment.

According to an embodiment of the present disclosure, the processing circuit 510 may map the generated modulated signal to feature vectors corresponding to the rank of the channel matrix of the MIMO system, where the number of feature vectors is equal to the rank. As mentioned above, the dimension number of the selected modulation code book is no bigger than the rank of the channel matrix of the MIMO system. According to an embodiment of the present disclosure, in a case that the dimension number of the selected modulation code book is equal to the rank of the channel matrix of the MIMO system, the modulated signal may be mapped to all feature vectors. In a case that the dimension number of the selected modulation code book is smaller than the rank of the channel matrix of the MIMO system, the modulated signal may be mapped to Q feature vectors with the largest feature value (where Q is the dimension number of the selected modulation code book), and the feature vector to which no signal is mapped may be used to transmit a signal that is not modulated by using the selected modulation code book, or may also transmit no signal.

According to an embodiment of the present disclosure, after the processing circuit 510 generates the modulated signal, the processing circuit 510 may generate a transmission signal according to the modulated signal, and the transceiver circuit 520 may transmit the transmission signal to the receiving side equipment.

It should be understood that the technical solution involved in the present disclosure is used for a modulation process before the precoding process. Therefore, after the modulated signal is generated using the modulation code book, a precoding process may also be performed.

According to an embodiment of the present disclosure, in a case that the electronic equipment 500 does not perform the precoding process, after the modulated signal is generated and mapped, the processing circuit 510 may directly map the modulated signal mapped to the feature vector directly to multiple transmitting antennas of the electronic equipment 500 to generate a transmission signal.

According to an embodiment of the present disclosure, in a case that the electronic equipment 500 performs the precoding process, after the modulated signal is generated and mapped, the processing circuit 510 may generate a precoded signal by performing the precoding process on the mapped modulated signal, and map the precoded signal to multiple transmitting antennas of the electronic equipment 500 to generate a transmission signal. The processing circuit 510 may multiply a precoding matrix with the generated modulated signal to generate the precoded signal.

As described above, after the transmission signal is generated, the electronic equipment 500 may start transmission based on the modulation code book selected by the receiving side until the electronic equipment 500 receives the information representing close of the transmission based on the modulation code book.

Figure 6:
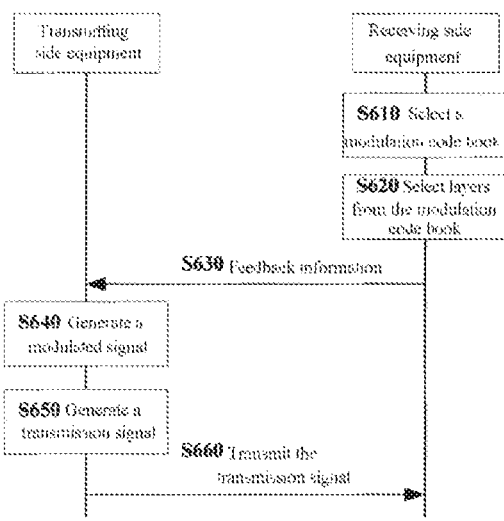
FIG. 6 is a schematic diagram showing a signaling flow of non-orthogonal transmission according to an embodiment of the present disclosure.

FIG. 6 is a schematic diagram showing a signaling flow of non-orthogonal transmission according to an embodiment of the present disclosure. As shown in FIG. 6, the transmitting side equipment and the receiving side equipment are devices in an MIMO system. For example, the transmitting side equipment may be the electronic equipment 500, and the receiving side equipment may be the electronic equipment 100. As shown in FIG. 6, if the receiving side equipment determines to start the transmission based on the modulation code book, the receiving side equipment selects a modulation code book in step S610. Next, optionally, in step S620, the receiving side equipment selects multiple layers from the modulation code book. Next, in step S630, the receiving side equipment transmits feedback information to the transmitting side equipment. The feedback information may include, for example, identification information of the selected modulation code book and information representing the start of transmission based on the modulation code book. Optionally, the configuration information may further include identification information of the selected multiple layers and/or power information of the multiple layers. Next, in step S640, after the transmitting side equipment receives such configuration information, the transmitting side equipment may generate a modulated signal based on the received configuration information. Next, in step S650, the transmitting side equipment may generate a transmission signal based on the modulated signal. Next, in step S660, the transmitting side equipment transmits the transmission signal until receiving information representing close of the transmission based on the modulation code book from the receiving side equipment.

Figure 7:
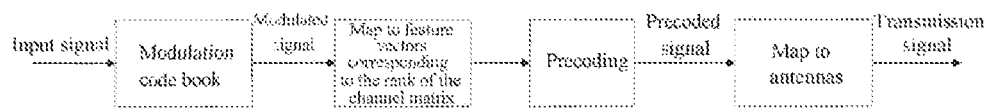
FIG. 7 is a schematic diagram showing a process of non-orthogonal transmission according to an embodiment of the present disclosure.

FIG. 7 is a schematic diagram showing a process of non-orthogonal transmission according to an embodiment of the present disclosure. As shown in FIG. 7, the transmitting side equipment firstly generates a modulated signal using a modulation code book and maps the modulated signal to feature vectors corresponding to the rank of the channel matrix of the MIMO system. Next, the transmitting side equipment performs a precoding process on the mapped modulated signal to generate a precoded signal, which is optional. Next, the transmitting side equipment maps the precoded signal to antennas of the transmitting side equipment to generate a transmission signal to be finally transmitted.

As described above, with the electronic equipment 500 according to the embodiment of the present disclosure, data to be transmitted can be modulated to multiple transmitting antennas to be transmitted using a modulation code book fed back by the receiving side equipment, thereby implementing non-orthogonal transmission of single user data on the multiple transmitting antennas. This solution can be applied in any MIMO system, including uplink transmission and downlink transmission. In addition, since the number of layers of the modulation code book is bigger than the dimension number thereof, the electronic equipment 500 can transmit more independent data flows by using less orthogonal channels, thereby increasing the numbers of data flows independently transmitted between the transmitting side equipment and the receiving side equipment, and improving transmission efficiency.

According to an embodiment of the present disclosure, the receiving side equipment corresponding to the electronic equipment 500 may be the electronic equipment 100 in the first embodiment, and thus all embodiments related to the electronic equipment 100 in the first embodiment are applicable thereto.

4. Third Embodiment

Next, a wireless communication method performed by a receiving side equipment in an MIMO communication system according to the present disclosure is described in detail. The receiving side equipment herein may be the electronic equipment 100 in the first embodiment, and thus all embodiments of the electronic equipment 100 in the first embodiment are applicable thereto.

Figure 8:
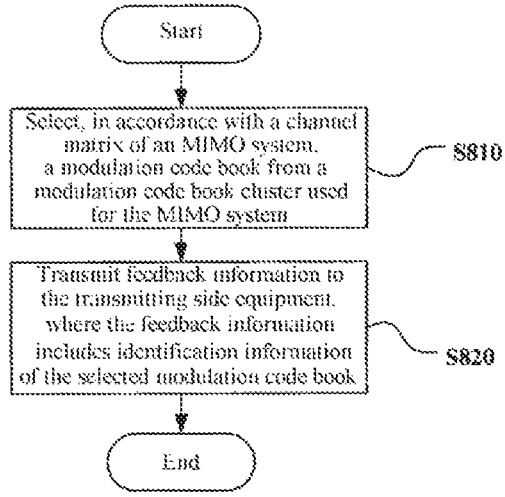
FIG. 8 is a flowchart showing a wireless communication method according to an embodiment of the present disclosure.

FIG. 8 is a flowchart showing a wireless communication method performed by a receiving side equipment according to an embodiment of the present disclosure.

As shown in FIG. 8, in step S810, a modulation code book is selected from a modulation code book cluster used for an MIMO system in accordance with a channel matrix of the MIMO system. The modulation code book cluster includes multiple modulation code books used for generating a modulated signal by a transmitting side equipment corresponding to the electronic equipment 100 and whose number of data flows transmitted after modulation is bigger than the number of an orthogonal channel.

Next, in step S820, feedback information is transmitted to the transmitting side equipment. The feedback information includes identification information of the selected modulation code book.

Preferably, the method further includes: selecting multiple layers from the selected modulation code book, where the feedback information includes identification information of the multiple layers.

Preferably, the method further includes: determining the power of the selected multiple layers, where the feedback information includes power information of the multiple layers.

Preferably, the step of selecting a modulation code book from a modulation code book cluster used for an MIMO system includes: selecting the modulation code book according to the rank of the channel matrix of the MIMO system.

Preferably, the selecting the modulation code book according to the rank of the channel matrix of the MIMO system includes: causing the dimension number of the selected modulation code book to be no bigger than the rank of the channel matrix of the MIMO system.

Preferably, the selecting multiple layers from the selected modulation code book includes: selecting the multiple layers according to at least one of: channel state of the MIMO system, rate requirement of the receiving side equipment, and demodulation ability of the receiving side equipment.

Preferably, the method further includes: transmitting information representing start or close of transmission based on the selected modulation code book.

Preferably, the modulation code book included in the modulation code book cluster is a modulation code book based on sparse code multiple access SCMA.

Preferably, the method further includes: receiving, from the transmitting side equipment, a transmission signal generated by the transmitting side equipment by using the modulated signal generated based on the selected modulation code book.

The wireless communication method performed by the receiving side equipment according to the embodiment of the present disclosure has been described in detail when describing the first embodiment, and details thereof are not described herein again.

5. Fourth Embodiment

Next, a wireless communication method performed by a transmitting side equipment in an MIMO communication system according to the present disclosure is described in detail. The transmitting side equipment herein may be the electronic equipment 500 in the second embodiment, and thus all embodiments of the electronic equipment 500 in the second embodiment are applicable thereto.

Figure 9:
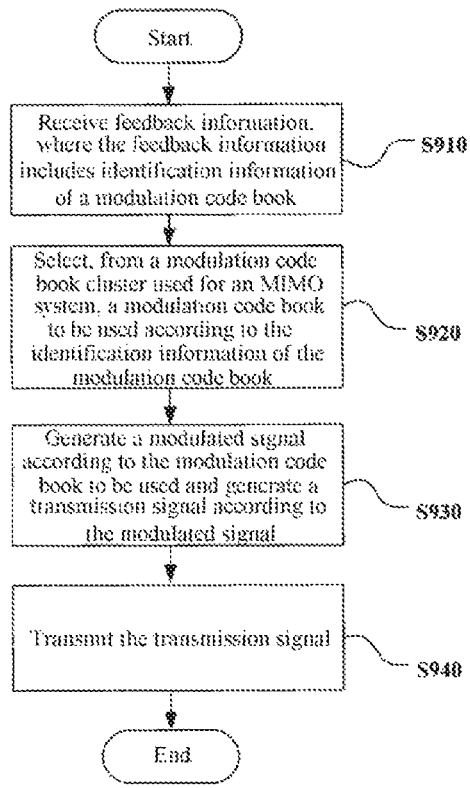
FIG. 9 is a flowchart showing a wireless communication method according to another embodiment of the present disclosure.

FIG. 9 is a flowchart showing a wireless communication method performed by a transmitting side equipment according to an embodiment of the present disclosure.

As shown in FIG. 9, in step S910, feedback information is received. The feedback information includes identification information of a modulation code book.

Next, in step S920, a modulation code book to be used is selected from a modulation code book cluster used for an MIMO system according to the identification information of the modulation code book. The modulation code book cluster includes multiple modulation code books used for generating a modulated signal by the electronic equipment 500 and whose number of data flows transmitted after modulation is bigger than the number of an orthogonal channel.

Next, in step S930, a modulated signal is generated according to the modulation code book to be used, and a transmission signal is generated according to the modulated signal.

Next, in step S940, the transmission signal is transmitted.

Preferably, the feedback information further includes identification information of the multiple layers, and the method further includes: selecting multiple layers to be used from the modulation code book to be used according to the identification information of the multiple layers.

Preferably, the feedback information further includes power information of the multiple layers.

Preferably, the feedback information further includes information representing start or close of transmission based on the modulation code book included in the feedback information.

The wireless communication method performed by the transmitting side equipment according to the embodiment of the present disclosure has been described in detail when describing the second embodiment, and details thereof are not described herein again.

6. Application Example

The technology of the present disclosure may be applied to various products. For example, the electronic equipment 100 and the electronic equipment 500 may be implemented as a network side device and a terminal device. Further, the electronic equipment 100 may function as a receiving side equipment in wireless communication, and the electronic equipment 500 may function as a transmitting side equipment in wireless communication. That is, in uplink transmission of cellular communication, the electronic equipment 100 may be implemented as a network side device, and the electronic equipment 500 may be implemented as a terminal device; in downlink transmission of cellular communication, the electronic equipment 100 may be implemented as a terminal device, and the electronic equipment 500 may be implemented as a network side device; and in a communication mode such as D2D communication, M2M communication and V2V communication, the electronic equipment 100 and the electronic equipment 500 each may be implemented as a terminal device.

The network side device may be implemented as a base station. The base station may be implemented as any type of eNB, such as a macro eNB and a small eNB. The base station may also be implemented as any type of gNB. The small eNB may be an eNB covering a cell smaller than a macro cell, such as a pico eNB, a micro eNB and a home (femto) eNB. Alternatively, the base station may be implemented as any other type of base stations, such as a NodeB and a base transceiver station (BTS). The base station may include: a main body (which is also referred to as a base station device) configured to control wireless communication; and one or more remote radio heads (RRH) located at positions different from the main body. In addition, various types of terminals described below each may operate as a base station by temporarily or semi-persistently performing functions of the base station.

The terminal device may be implemented as a mobile terminal (such as a smart phone, a tablet personal computer (PC), a notebook PC, a portable game terminal, a portable/dongle mobile router and a digital camera) or an in-vehicle terminal (such as a car navigation device). The terminal device may also be implemented as a terminal (which is also referred to as a machine type communication (MTC) terminal) that performs machine-to-machine (M2M) communication. In addition, the terminal device may be a wireless communication module (such as an integrated circuit module including a single wafer) installed on each of the terminals.

6-1. Application Example On Base Station

First Application Example

Figure 10:
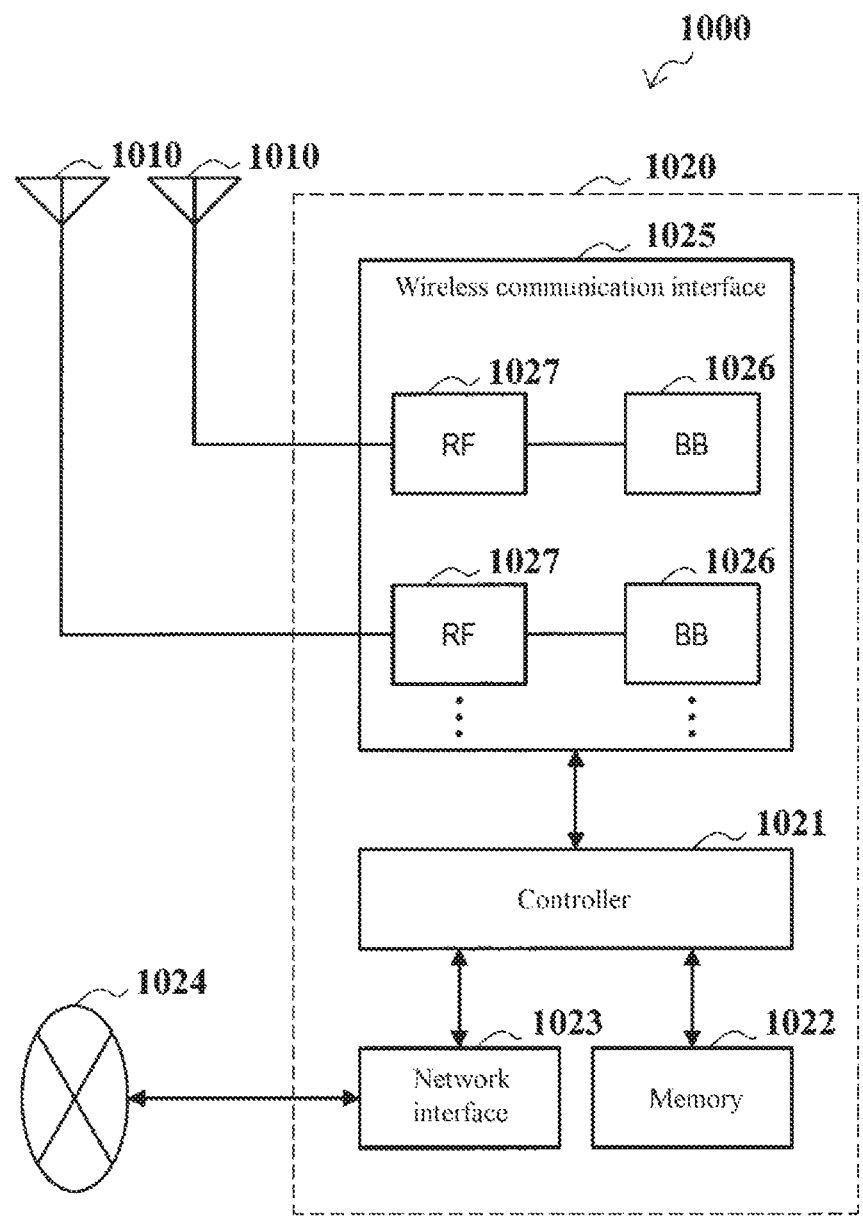
FIG. 10 is a block diagram showing a first schematic configuration example of an evolved Node B (eNB)

FIG. 10 is a block diagram showing a first schematic configuration example of an eNB to which the technology of the present disclosure may be applied. An eNB 1000 includes one or more antennas 1010 and a base station device 1020. The base station device 1020 and each antenna 1010 may be connected to each other via an RF cable.

Each of the antennas 1010 includes a single or multiple antenna elements (such as multiple antenna elements included in a multiple-input multiple-output (MIMO) antenna), and is used for the base station device 1020 to transmit and receive wireless signals. As shown in FIG. 10, the eNB 1000 may include the multiple antennas 1010. For example, the multiple antennas 1010 may be compatible with multiple frequency bands used by the eNB 1000. Although FIG. 10 shows the example in which the eNB 1000 includes the multiple antennas 1010, the eNB 1000 may also include a single antenna 1010.

The base station device 1020 includes a controller 1021, a memory 1022, a network interface 1023, and a wireless communication interface 1025.

The controller 1021 may be, for example, a CPU or a DSP and operates various functions of a higher layer of the base station device 1020. For example, the controller 1021 generates a data packet from data in a signal processed by the wireless communication interface 1025, and transfers the generated packet via the network interface 1023. The controller 1021 may bundle data from multiple base band processors to generate the bundled packet, and transfer the generated bundled packet. The controller 1021 may have logical functions of performing control such as radio resource control, radio bearer control, mobility management, admission control and scheduling. The control may be performed in corporation with an eNB or a core network node in the vicinity. The memory 1022 includes a RAM and a ROM, and stores a program executed by the controller 1021, and various types of control data (such as a terminal list, transmission power data, and scheduling data).

The network interface 1023 is a communication interface for connecting the base station device 1020 to a core network 1024. The controller 1021 may communication with a core network node or another eNB via the network interface 1023. In this case, the eNB 1000 and the core network node or the another eNB may be connected to each other via a logical interface (such as an S1 interface and an X2 interface). The network interface 1023 may also be a wired communication interface or a wireless communication interface for wireless backhaul. If the network interface 1023 is a wireless communication interface, the network interface 1023 may use a higher frequency band for wireless communication than a frequency band used by the wireless communication interface 1025.

The wireless communication interface 1025 supports any cellular communication scheme (such as long term evolution (LTE) and LTE-advanced), and provides wireless connection to a terminal located in a cell of the eNB 1000 via the antenna 1010. The wireless communication interface 1025 may typically include, for example, a baseband (BB) processor 1026 and an RF circuit 1027. The BB processor 1026 may perform, for example, encoding/decoding, modulating/demodulating, and multiplexing/demultiplexing, and perform various types of signal processing of layers (such as L1, medium access control (MAC), radio link control (RLC) and a packet data convergence protocol (PDCP)). The BB processor 1026 may have a part or all of the above logical functions instead of the controller 1021. The BB processor 1026 may be a memory that stores a communication control program, or a module that includes a processor and a related circuit configured to execute the program. Updating the program may allow the functions of the BB processor 1026 to be changed. The module may be a card or a blade that is inserted into a slot of the base station device 1020. Alternatively, the module may also be a chip that is installed on the card or the blade. Meanwhile, the RF circuit 1027 may include, for example, a mixer, a filter, and an amplifier, and transmits and receives wireless signals via the antenna 1010.

As shown in FIG. 10, the wireless communication interface 1025 may include the multiple BB processors 1026. For example, the multiple BB processors 1026 may be compatible with multiple frequency bands used by the eNB 1000. As shown in FIG. 10, the wireless communication interface 1025 may include the multiple RF circuits 1027. For example, the multiple RF circuits 1027 may be compatible with multiple antenna elements. Although FIG. 10 shows the example in which the wireless communication interface 1025 includes the multiple BB processors 1026 and the multiple RF circuits 1027, the wireless communication interface 1025 may also include a single BB processor 1026 or a single RF circuit 1027.

Second Application Example

Figure 11:
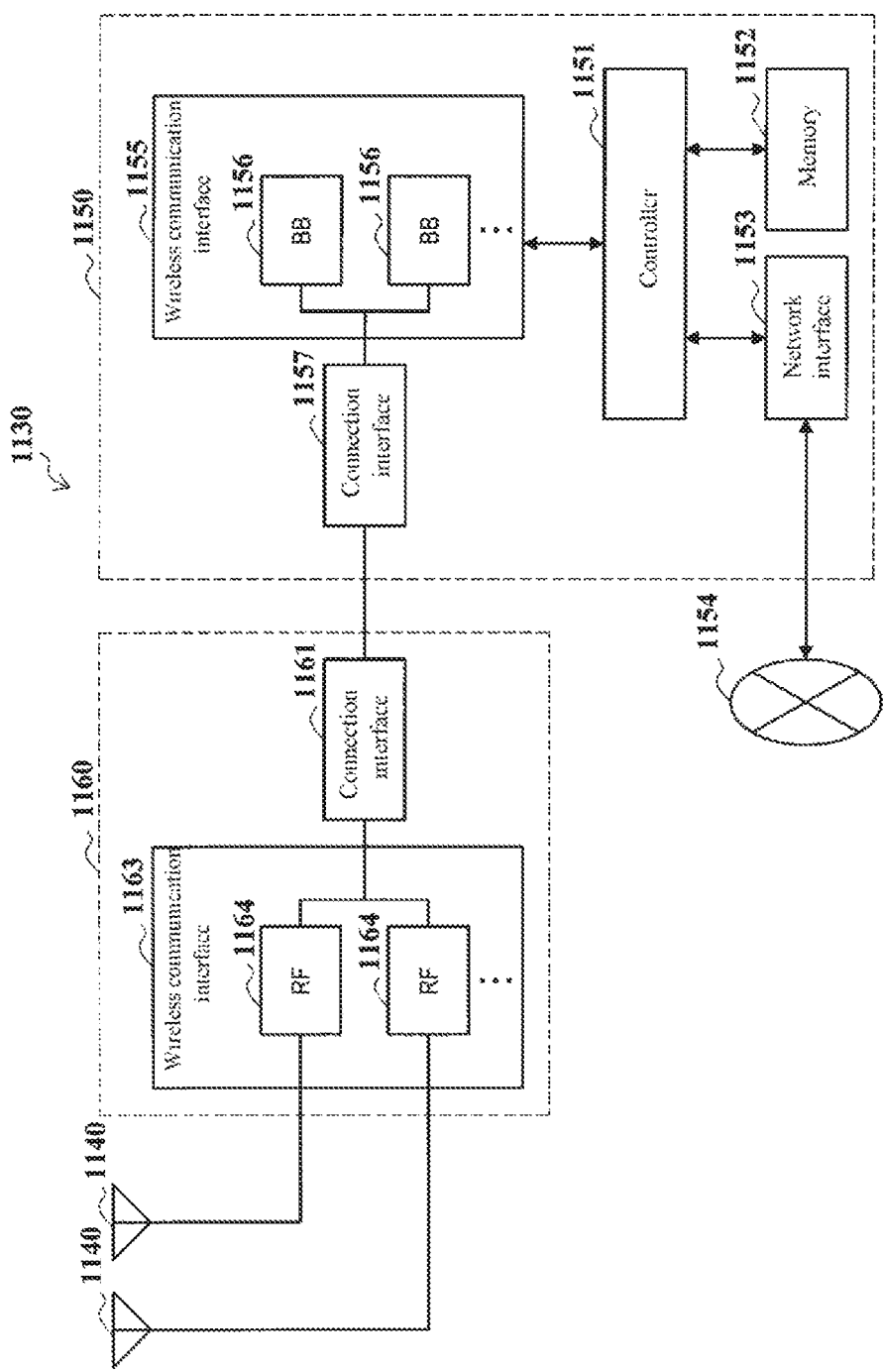
FIG. 11 is a block diagram showing a second schematic configuration example of the eNB.

FIG. 11 is a block diagram showing a second schematic configuration example of an eNB to which the technology of the present disclosure may be applied. An eNB 1130 includes one or more antennas 1140, a base station device 1150, and an RRH 1160. The RRH 1160 and each antenna 1140 may be connected to each other via an RF cable. The base station device 1150 and the RRH 1160 may be connected to each other via a high speed line such as an optical fiber cable.

Each of the antennas 1140 includes a single or multiple antenna elements (such as multiple antenna elements included in an MIMO antenna), and is used for the RRH 1160 to transmit and receive wireless signals. As shown in FIG. 11, the eNB 1130 may include the multiple antennas 1140. For example, the multiple antennas 1140 may be compatible with multiple frequency bands used by the eNB 1130. Although FIG. 11 shows the example in which the eNB 1130 includes the multiple antennas 1140, the eNB 1130 may also include a single antenna 1140.

The base station device 1150 includes a controller 1151, a memory 1152, a network interface 1153, a wireless communication interface 1155, and a connection interface 1157. The controller 1151, the memory 1152, and the network interface 1153 are the same as the controller 1021, the memory 1022, and the network interface 1023 described with reference to FIG. 10.

The wireless communication interface 1155 supports any cellular communication scheme (such as LTE and LTE-Advanced) and provides wireless communication to a terminal located in a sector corresponding to the RRH 1160 via the RRH 1160 and the antenna 1140. The wireless communication interface 1155 may typically include, for example, a BB processor 1156. The BB processor 1156 is the same as the BB processor 1026 described with reference to FIG. 10, except the BB processor 1156 is connected to an RF circuit 1164 of the RRH 1160 via the connection interface 1157. As show in FIG. 11, the wireless communication interface 1155 may include the multiple BB processors 1156. For example, the multiple BB processors 1156 may be compatible with multiple frequency bands used by the eNB 1130. Although FIG. 11 shows the example in which the wireless communication interface 1155 includes the multiple BB processors 1156, the wireless communication interface 1155 may also include a single BB processor 1156.

The connection interface 1157 is an interface for connecting the base station device 1150 (wireless communication interface 1155) to the RRH 1160. The connection interface 1157 may also be a communication module for communication in the above-described high speed line that connects the base station device 1150 (wireless communication interface 1155) to the RRH 1160.

The RRH 1160 includes a connection interface 1161, and a wireless communication interface 1163.

The connection interface 1161 is an interface for connecting the RRH 1160 (wireless communication interface 1163) to the base station device 1150. The connection interface 1161 may also be a communication module for communication in the above-described high speed line.

The wireless communication interface 1163 transmits and receives wireless signals via the antenna 1140. The wireless communication interface 1163 may typically include, for example, the RF circuit 1164. The RF circuit 1164 may include, for example, a mixer, a filter, and an amplifier, and transmits and receives wireless signals via the antenna 1140. As shown in FIG. 11, the wireless communication interface 1163 may include multiple RF circuits 1164. For example, the multiple RF circuits 1164 may support multiple antenna elements. Although FIG. 11 shows the example in which the wireless communication interface 1163 includes the multiple RF circuits 1164, the wireless communication interface 1163 may also include a single RF circuit 1164.

In the eNB 1000 shown in FIG. 10 and the eNB 1130 shown in FIG. 11, the processing circuit 110 described with reference to FIG. 1 and the processing circuit 510 described with reference to FIG. 5 may be implemented by the controller 1021 and/or the controller 1151. At least a part of functions may be implemented by the controller 1021 and the controller 1151. For example, the controller 1021 and/or the controller 1151 may perform a function of selecting a modulation code book by executing instructions stored in the corresponding memory.

6-2. Application Example On Terminal Device

First Application Example

Figure 12:
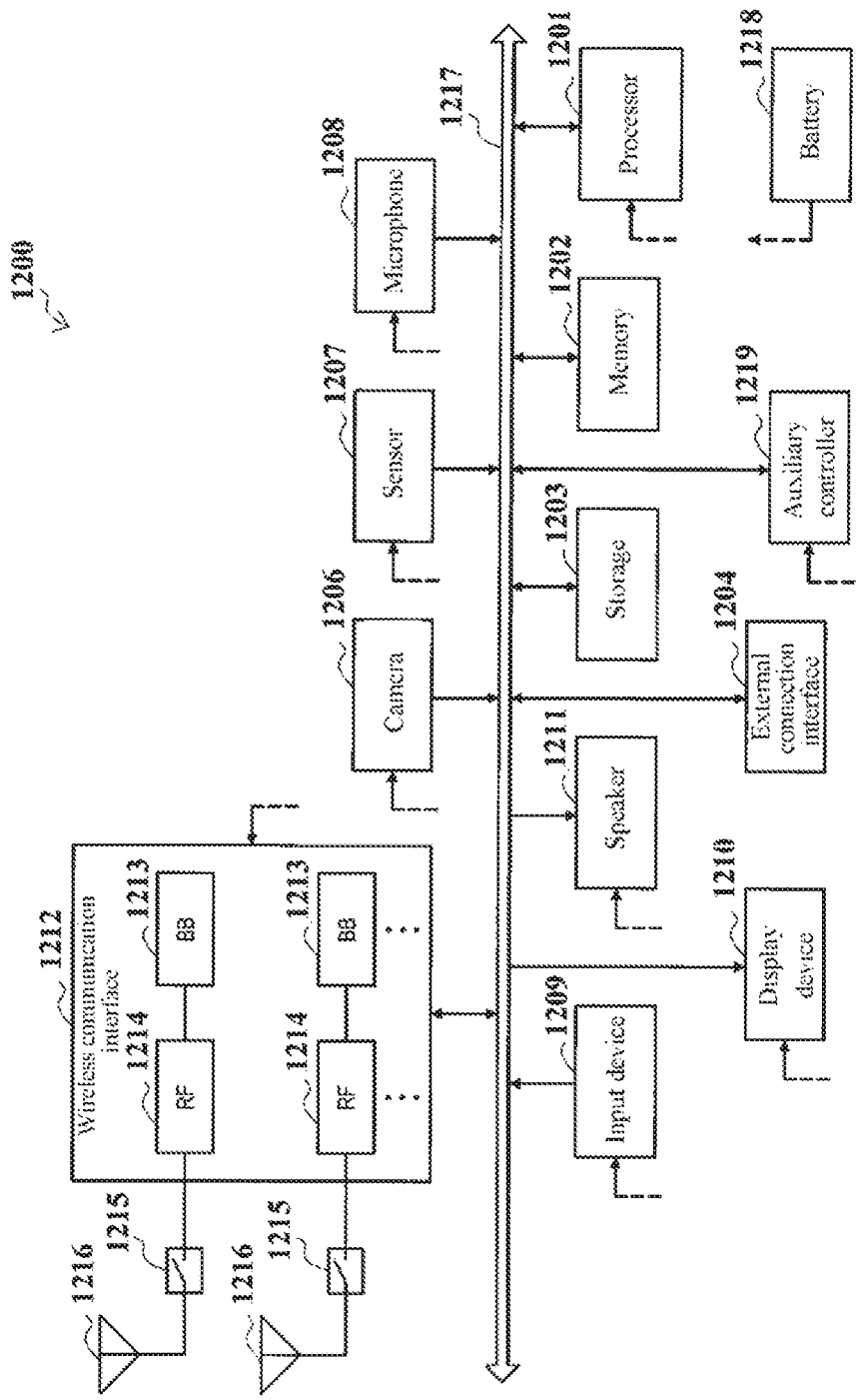
FIG. 12 is a block diagram showing a schematic configuration example of a smart phone.

FIG. 12 is a block diagram showing a schematic configuration example of a smart phone 1200 to which the technology of the present disclosure may be applied. The smart phone 1200 includes a processor 1201, a memory 1202, a storage 1203, an external connection interface 1204, a camera 1206, a sensor 1207, a microphone 1208, an input device 1209, a display device 1210, a speaker 1211, a wireless communication interface 1212, one or more antenna switches 1215, one or more antennas 1216, a bus 1217, a battery 1218, and an auxiliary controller 1219.

The processor 1201 may be, for example, a CPU or a system on a chip (SoC), and controls functions of an application layer and another layer of the smart phone 1200. The memory 1202 includes a RAM and a ROM, and stores a program that is executed by the processor 1201, and data. The storage 1203 may include a storage medium such as a semiconductor memory and a hard disk. The external connection interface 1204 is an interface for connecting an external device (such as a memory card and a universal serial bus (USB) device) to the smart phone 1200.

The camera 1206 includes an image sensor (such as a charge coupled device (CCD) and a complementary metal oxide semiconductor (CMOS)), and generates a captured image. The sensor 1207 may include a group of sensors such as a measurement sensor, a gyro sensor, a geomagnetic sensor, and an acceleration sensor. The microphone 1208 converts sounds that are inputted to the smart phone 1200 into audio signals. The input device 1209 includes, for example, a touch sensor configured to detect touch onto a screen of the display device 1210, a keypad, a keyboard, a button, or a switch, and receives an operation or information inputted from a user. The display device 1210 includes a screen (such as a liquid crystal display (LCD) and an organic light-emitting diode (OLED) display), and displays an output image of the smart phone 1200. The speaker 1211 converts audio signals that are outputted from the smart phone 1200 to sounds.

The wireless communication interface 1212 supports any cellular communication scheme (such as LTE and LTE-Advanced), and performs wireless communication. The wireless communication interface 1212 may typically include, for example, a BB processor 1213 and an RF circuit 1214. The BB processor 1213 may perform, for example, encoding/decoding, modulating/demodulating, and multiplexing/demultiplexing, and performs various types of signal processing for wireless communication. Meanwhile, the RF circuit 1214 may include, for example, a mixer, a filter, and an amplifier, and transmits and receives wireless signals via the antenna 1216. The wireless communication interface 1212 may be a chip module having the BB processor 1213 and the RF circuit 1214 integrated thereon. As shown in FIG. 12, the wireless communication interface 1212 may include multiple BB processors 1213 and multiple RF circuits 1214. Although FIG. 12 shows the example in which the wireless communication interface 1212 includes the multiple BB processors 1213 and the multiple RF circuits 1214, the wireless communication interface 1212 may also include a single BB processor 1213 or a single RF circuit 1214.

Furthermore, in addition to a cellular communication scheme, the wireless communication interface 1212 may support another type of wireless communication scheme such as a short-distance wireless communication scheme, a near field communication scheme, and a wireless local area network (LAN) scheme. In this case, the wireless communication interface 1212 may include the BB processor 1213 and the RF circuit 1214 for each wireless communication scheme.

Each of the antenna switches 1215 switches connection destinations of the antennas 1216 among multiple circuits (such as circuits for different wireless communication schemes) included in the wireless communication interface 1212.

Each of the antennas 1216 includes a single or multiple antenna elements (such as multiple antenna elements included in an MIMO antenna), and is used for the wireless communication interface 1212 to transmit and receive wireless signals. As shown in FIG. 12, the smart phone 1200 may include the multiple antennas 1216. Although FIG. 12 shows the example in which the smart phone 1200 includes the multiple antennas 1216, the smart phone 1200 may also include a single antenna 1216.

Furthermore, the smart phone 1200 may include the antenna 1216 for each wireless communication scheme. In this case, the antenna switches 1215 may be omitted from the configuration of the smart phone 1200.

The bus 1217 connects the processor 1201, the memory 1202, the storage 1203, the external connection interface 1204, the camera 1206, the sensor 1207, the microphone 1208, the input device 1209, the display device 1210, the speaker 1211, the wireless communication interface 1212, and the auxiliary controller 1219 to each other. The battery 1218 supplies power to blocks of the smart phone 1200 shown in FIG. 12 via feeder lines that are partially shown as dashed lines in FIG. 12. The auxiliary controller 1219 operates a minimum necessary function of the smart phone 1200, for example, in a sleep mode.

In the smart phone 1200 shown in FIG. 12, the processing circuit 110 described with reference to FIG. 1 and the processing circuit 510 described with reference to FIG. 5 may be implemented by the processor 1201 or the auxiliary controller 1219. At least a part of functions may be implemented by the processor 1201 or the auxiliary controller 1219. For example, the processor 1201 or the auxiliary controller 1219 may perform a function of selecting a modulation code book by executing instructions stored in the memory 1202 or the storage 1203.

Second Application Example

Figure 13:
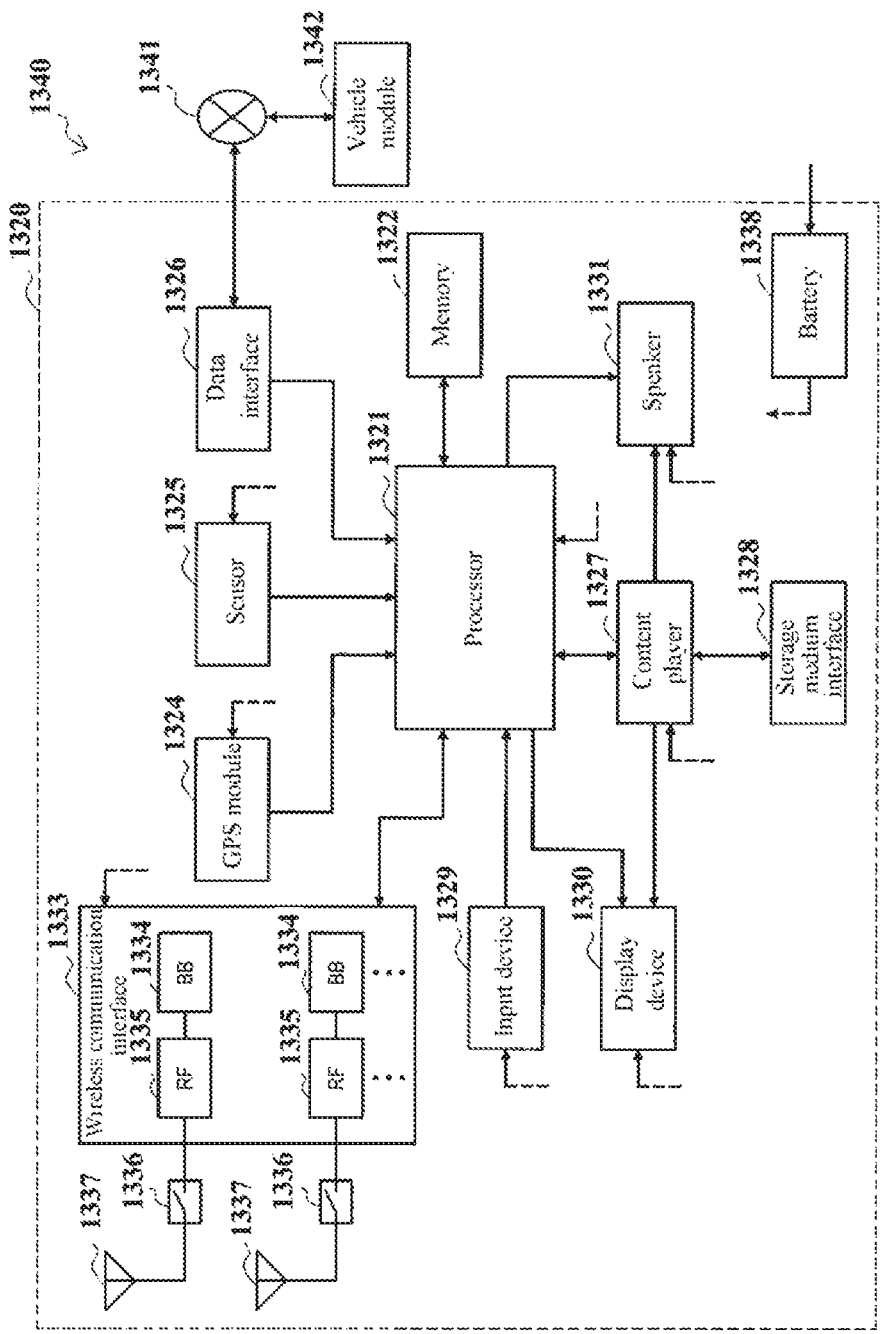
FIG. 13 is a block diagram showing a schematic configuration example of a car navigation device.

FIG. 13 is a block diagram showing a schematic configuration example of a car navigation device 1320 to which the technology of the present disclosure may be applied. The car navigation device 1320 includes a processor 1321, a memory 1322, a global positioning system (GPS) module 1324, a sensor 1325, a data interface 1326, a content player 1327, a storage medium interface 1328, an input device 1329, a display device 1330, a speaker 1331, a wireless communication interface 1333, one or more antenna switches 1336, one or more antennas 1337, and a battery 1338.

The processor 1321 may be, for example, a CPU or an SoC, and controls a navigation function and another function of the car navigation device 1320. The memory 1322 includes a RAM and a ROM, and stores a program that is executed by the processor 1321 and data.

The GPS module 1324 determines a position (such as latitude, longitude, and altitude) of the car navigation device 1320 by using GPS signals received from a GPS satellite. The sensor 1325 may include a group of sensors such as a gyro sensor, a geomagnetic sensor, and an air pressure sensor. The data interface 1326 is connected to, for example, an in-vehicle network 1341 via a terminal that is not shown, and acquires data (such as vehicle speed data) generated by the vehicle.

The content player 1327 reproduces content stored in a storage medium (such as a CD and a DVD) that is inserted into the storage medium interface 1328. The input device 1329 includes, for example, a touch sensor configured to detect touch onto a screen of the display device 1330, a button or a switch, and receives an operation or information inputted from a user. The display device 1330 includes a screen such as a LCD or an OLED display, and displays an image of the navigation function or content that is reproduced. The speaker 1331 outputs sounds of the navigation function or the content that is reproduced.

The wireless communication interface 1333 supports any cellular communication scheme (such as LTE and LTE-advanced), and performs wireless communication. The wireless communication interface 1333 may typically include, for example, a BB processor 1334 and an RF circuit 1335. The BB processor 1334 may perform, for example, encoding/decoding, modulating/demodulating, and multiplexing/demultiplexing, and performs various types of signal processing for wireless communication. Meanwhile, the RF circuit 1335 may include, for example, a mixer, a filter, and an amplifier, and transmits and receives wireless signals via the antenna 1337. The wireless communication interface 1333 may also be a chip module having the BB processor 1334 and the RF circuit 1335 integrated thereon. As shown in FIG. 13, the wireless communication interface 1333 may include the multiple BB processors 1334 and the multiple RF circuits 1335. Although FIG. 13 shows the example in which the wireless communication interface 1333 includes the multiple BB processors 1334 and the multiple RF circuits 1335, the wireless communication interface 1333 may also include a single BB processor 1334 or a single RF circuit 1335.

Furthermore, in addition to a cellular communication scheme, the wireless communication interface 1333 may support another type of wireless communication scheme such as a short-distance wireless communication scheme, a near field communication scheme, and a wireless LAN scheme. In that case, the wireless communication interface 1333 may include the BB processor 1334 and the RF circuit 1335 for each wireless communication scheme.

Each of the antenna switches 1336 switches connection destinations of the antennas 1337 among multiple circuits (such as circuits for different wireless communication schemes) included in the wireless communication interface 1333.

Each of the antennas 1337 includes a single or multiple antenna elements (such as multiple antenna elements included in an MIMO antenna), and is used for the wireless communication interface 1333 to transmit and receive wireless signals. As shown in FIG. 13, the car navigation device 1320 may include the multiple antennas 1337. Although FIG. 13 shows the example in which the car navigation device 1320 includes the multiple antennas 1337, the car navigation device 1320 may also include a single antenna 1337.

Furthermore, the car navigation device 1320 may include the antenna 1337 for each wireless communication scheme. In that case, the antenna switches 1336 may be omitted from the configuration of the car navigation device 1320.

The battery 1338 supplies power to blocks of the car navigation device 1320 shown in FIG. 13 via feeder lines that are partially shown as dashed lines in FIG. 13. The battery 1338 accumulates power supplied from the vehicle.

In the car navigation device 1320 shown in FIG. 13, the processing circuit 110 described with reference to FIG. 1 and the processing circuit 510 described with reference to FIG. 5 may be implemented by the processor 1321. At least a part of functions may be implemented by the processor 1321. For example, the processor 1321 may perform a function of selecting a modulation code book by executing instructions stored in the memory 1322.

The technology of the present disclosure may also be implemented as an in-vehicle system (or a vehicle) 1340 including one or more blocks of the car navigation device 1320, the in-vehicle network 1341 and a vehicle module 1342. The vehicle module 1342 generates vehicle data (such as a vehicle speed, an engine speed, or failure information), and outputs the generated data to the in-vehicle network 1341.

In the system and the method of the present disclosure, it is apparent that various components or steps may be decomposed and/or recombined. These decomposition and/or recombination should be regarded as equivalent solutions of the present disclosure. In addition, the steps performing a series of processing above may be performed in the describing order naturally, but it is not necessary. Some steps may be performed concurrently or independently with each other.

While the embodiments of the present disclosure have been described in detail with reference to the drawings, it should be understood that the above described embodiments are merely used to illustrate the present disclosure and are not intended to limit the present disclosure. For those skilled in the art, various modifications and variations may be made on the above described embodiments without departing from the essence and scope of the present disclosure. Accordingly, the scope of the present disclosure is defined only by the appended claims and equivalents thereof.

The invention claimed is:

1. An electronic equipment, comprising:
 a processing circuit configured to select, in accordance with a channel matrix of a Multi-Input Multi-Output (MIMO) system, a modulation code book from a modulation code book cluster used for the MIMO system, wherein the modulation code book cluster comprises a plurality of modulation code books used for generating a modulated signal by a transmitting side equipment corresponding to the electronic equipment and whose number of data flows transmitted after modulation is bigger than the number of an orthogonal channel; and
 a transceiver circuit configured to transmit feedback information to the transmitting side equipment, the feedback information comprising identification information of the selected modulation code book.

2. The electronic equipment according to claim 1, wherein the processing circuit is further configured to select a plurality of layers from the selected modulation code book, and the feedback information further comprises identification information of the plurality of layers.

3. The electronic equipment according to claim 2, wherein the processing circuit is further configured to determine power of the selected plurality of layers, and the feedback information further comprises power information of the plurality of layers.

4. The electronic equipment according to claim 1, wherein the processing circuit is further configured to select the modulation code book according to the rank of the channel matrix of the MIMO system.

5. The electronic equipment according to claim 4, wherein the processing circuit is further configured to cause the dimension number of the selected modulation code book to be no bigger than the rank of the channel matrix of the MIMO system.

6. The electronic equipment according to claim 2, wherein the processing circuit is further configured to select the plurality of layers according to at least one of: channel state of the MIMO system, rate requirement of the electronic equipment, and demodulation ability of the electronic equipment.

7. The electronic equipment according to claim 1, wherein the feedback information further includes information representing start or close of transmission based on the selected modulation code book.

8. The electronic equipment according to claim 1, wherein the modulation code book comprised in the modulation code book cluster is a modulation code book based on Sparse Code Multiple Access (SCMA).

9. The electronic equipment according to claim 1, wherein the transceiver circuit is further configured to receive, from the transmitting side equipment, a transmission signal generated by the transmitting side equipment by using the modulated signal generated based on the selected modulation code book.

10. An electronic equipment, comprising:
a transceiver circuit configured to receive feedback information, the feedback information comprising identification information of a modulation code book; and
a processing circuit configured to select, from a modulation code book cluster used for a Multi-Input Multi-Output (MIMO) system, a modulation code book to be used according to the identification information of the modulation code book, and generate a modulated signal according to the modulation code book to be used and generate a transmission signal according to the modulated signal, wherein the modulation code book cluster comprises a plurality of modulation code books used for generating a modulated signal by the electronic equipment and whose number of data flows transmitted after modulation is bigger than the number of an orthogonal channel,
wherein the transceiver circuit is further configured to transmit the transmission signal.

11. The electronic equipment according to claim 10, wherein the feedback information further comprises identification information of a plurality of layers, and the processing circuit is further configured to select a plurality of layers to be used from the modulation code book to be used according to the identification information of the plurality of layers.

12. The electronic equipment according to claim 11, wherein the feedback information further comprises power information of the plurality of layers.

13. The electronic equipment according to claim 10, wherein the feedback information further includes information representing start or close of transmission based on the modulation code book comprised in the feedback information.

14. A wireless communication method performed by an electronic equipment, comprising:
selecting, in accordance with a channel matrix of a Multi-Input Multi-Output (MIMO) system, a modulation code book from a modulation code book cluster used for the MIMO system, wherein the modulation code book cluster comprises a plurality of modulation code books used for generating a modulated signal by transmitting side equipment corresponding to the electronic equipment and whose number of data flows transmitted after modulation is bigger than the number of an orthogonal channel; and
transmitting feedback information to the transmitting side equipment, the feedback information comprising identification information of the selected modulation code book.

* * * * *